(12) United States Patent
Joye et al.

(10) Patent No.: US 9,979,551 B2
(45) Date of Patent: May 22, 2018

(54) SIGNING METHOD DELIVERING A PARTIAL SIGNATURE ASSOCIATED WITH A MESSAGE, THRESHOLD SIGNING METHOD, SIGNATURE VERIFICATION METHOD, AND CORRESPONDING COMPUTER PROGRAM AND ELECTRONIC DEVICES

(71) Applicant: THOMSON LICENSING, Issy de Moulineaux (FR)

(72) Inventors: Marc Joye, Fougeres (FR); Benoit Libert, Lyons (FR)

(73) Assignee: Thomson Licensing, Issy-les-Moulineaux (FR)

(*) Notice: Subject to any disclaimer, the term of this patent is extended or adjusted under 35 U.S.C. 154(b) by 102 days.

(21) Appl. No.: 14/618,004

(22) Filed: Feb. 10, 2015

(65) Prior Publication Data

US 2015/0229480 A1 Aug. 13, 2015

(30) Foreign Application Priority Data

Feb. 10, 2014 (EP) .................................... 14305176

(51) Int. Cl.
| | |
|---|---|
| G06F 21/62 | (2013.01) |
| H04L 9/32 | (2006.01) |
| H04L 9/00 | (2006.01) |
| H04L 9/08 | (2006.01) |
| H04L 9/30 | (2006.01) |

(52) U.S. Cl.
CPC ............ *H04L 9/3255* (2013.01); *H04L 9/008* (2013.01); *H04L 9/085* (2013.01); *H04L 9/3073* (2013.01); *H04L 9/3247* (2013.01)

(58) Field of Classification Search
CPC ....... H04L 9/008; H04L 9/085; H04L 9/3073; H04L 9/3247; H04L 9/3255
See application file for complete search history.

(56) References Cited

U.S. PATENT DOCUMENTS

| | | | |
|---|---|---|---|
| 8,433,910 B2* | 4/2013 | Takenaka | H04L 9/3249 713/176 |
| 2010/0037055 A1* | 2/2010 | Fazio | H04L 9/3218 713/171 |

(Continued)

OTHER PUBLICATIONS

Libert, B., Peters, T., Joye, M., and Yung, M.: Non-Malleability from Malleability: Simulation-Sound Quasi-Adaptive NIZK Proofs and CCA2-Secure Encryption from Homomorphic Signatures. In: Crypology ePrint Archive: Report 2013/691. Posted Oct. 28, 2013.*

(Continued)

*Primary Examiner* — Theodore C Parsons
(74) *Attorney, Agent, or Firm* — Myers Wolin LLC

(57) ABSTRACT

In one embodiment, it is proposed a signing method delivering a partial signature associated with a message, said partial signature being used in a threshold signing method, the signing method being executed on an electronic device. Such signing method is remarkable in that it comprises signing a hash of said message with a one-time linearly homomorphic structure preserving signature method with a partial secret key, said partial secret key being obtained from an output of a secret sharing scheme, and said signing delivering said partial signature associated with said message.

12 Claims, 5 Drawing Sheets

(56) References Cited

U.S. PATENT DOCUMENTS

| | | | |
|---|---|---|---|
| 2011/0060901 A1* | 3/2011 | Troncoso Pastoriza | H04L 9/008 713/150 |
| 2011/0060917 A1* | 3/2011 | Troncoso Pastoriza | G06F 21/6245 713/189 |
| 2011/0060918 A1* | 3/2011 | Troncoso Pastoriza | G06F 21/72 713/189 |
| 2012/0144186 A1* | 6/2012 | Puiggali Allepuz | H04L 9/3013 713/150 |
| 2013/0046993 A1* | 2/2013 | Jueneman | G06F 21/32 713/186 |
| 2013/0326224 A1* | 12/2013 | Yavuz | H04L 9/3247 713/176 |

OTHER PUBLICATIONS

Libert, B., and Yung, M.: "Non-Interactive CCA-Secure Threshold Cryptosystems with Adaptive Security: New Framework and Constructions", Theory of Cryptography Conference (pp. 75-93), Springer Berlin Heidelberg, Mar. 19, 2012.*

Libert, B., Peters, T., Joye, M., and Yung, M.: "Linearly Homomorphic Structure-Preserving Signatures and Their Applications", Advances in Cryptology—CRYPTO 2013 (pp. 289-307), Springer Berlin Heidelberg, 2013.*

Attrapadung, N., Libert, B., and Peters, T.: "Efficient Completely Context-Hiding Quotable and Linearly Homomorphic Signatures", International Workshop on Public Key Cryptography—PKC 2013 (pp. 386-404), Springer Berlin Heidelberg, 2013.*

Stinson etal: "Provably secure distributed schnorr signatures and a threshold scheme for implicit certificates"; Lecture notes in computer Science/Computational science; Eurocrypt 2008;Jul. 11, 2001 (Jul. 11, 2007)pp. 417-434.

Abe et Al: "Constant-Size Structure-Preserving Signatures: Generic Constructions and Simple Assumptions" In Asiacrypt'12, LNCS 7658, pp. 4-24, 2012.

Abe et Al: "Adaptively Secure Feldman VSS and Applications to Universally-Composable Threshold Cryptography" I; in Crypto'04, LNCS 3152, pp. 317-334, 2004.

Abe et Al: "Signing on Elements in Bilinear Groups for Modular Protocol Design"; In Cryptology ePrint Archive: Report 2010/133; pp. 1-43.

Almansa et Al: "Simplified Threshold RSA with Adaptive and Proactive Security" In Eurocrypt'06, LNCS 4004, pp. 593-611, 2006.

Barreto et Al: "Pairing-Friendly Elliptic Curves of Prime Order" In SAC'05, LNCS 3897, pp. 319-331, 2005.

Bellare et Al: "Random oracles are practical A paradigm for designing efficient protocols"; In ACM CCS, pp. 62-73, 1993.

Boldyreva: "3 Threshold Signatures, Multisignatures and Blind Signatures Based on the Gap-Diffie-Hellman-Group Signature Scheme"; In Public-Key Cryptography 2003 (PKC'03), LNCS 2567, pp. 31-46, 2003.

Boneh et Al: "Short group signatures"; In Crypto'04, LNCS 3152, pp. 41-55, 2004.

Boyd: "Digital Multisignatures"; In Cryptography and Coding (H.J. Beker and F.C. Piper Eds.), Oxford University Press, pp. 241-246, 1989.

Canetti et Al: "Adaptive Security for Threshold Cryptosystems"; In Crypto'99, LNCS 1666, pp. 98-115, 1999.

Chen et Al: "Shorter IBE and Signatures via Asymmetric Pairings"; In Pairing 2012, LNCS 7708, pp. 122-140, 2012.

Coron: "On the Exact Security of Full Domain Hash"; In Crypto'00, LNCS series, pp. 229-235, 2000.

Cramer etal: "Efficient Multi-Party Computations Secure Against an Adaptive Adversary";In Eurocrypt'99, LNCS 1592, pp. 311-326, 1999.

Desmedt: "Society and Group Oriented Cryptography a New Concept"; In Crypto'87, LNCS 293, pp. 120-127, 1987.

Desmedt et al: "Threshold cryptosystems" In Crypto'89, LNCS 435; pp. 307-315.

Frankel et al: "Adaptively-Secure Distributed Public-Key Systems"; In ESA'99, LNCS 1643,pp. 535-561, 1999.

Frankel et Al: "Adaptively-Secure Optimal-Resilience Proactive RSA"; In Asiacrypt'99 LNCS 1716, pp. 180-194, 1999.

Freeman: "Converting Pairing-Based Cryptosystems from Composite-Order Groups to Prime-Order Groups"; In Eurocrypt'10, pp. 44-61, 2010.

Jarecki et Al: "Adaptively Secure Threshold Cryptography Introducing Concurrency, Removing Erasures"; In Eurocrypt'00, LNCS 1807, pp. 221-242, 2000.

Katz et Al: "Threshold Cryptosystems Based on Factoring"; In Asiacrypt'02, LNCS series, pp. 199-205, 2002.

Lewko et Al: "New Techniques for Dual System Encryption and Fully Secure HIBE with Short Ciphertexts"; In TCC 2010, LNCS 5978, pp. 455-479, 2010.

Lewko: "Tools for Simulating Features of Composite Order Bilinear Groups in the Prime Order Setting"; In Eurocrypt 2012, LNCS 5978, pp. 318-333, 2012.

Libert etal: "Linearly Homomorphic Structure-Preserving Signatures and their Applications"; In Crypto 2013, LNCS series, to appear, 2013; pp. 1-31.

Libert et Al: "Adaptively Secure Non-Interactive Threshold Cryptosystems"; Theoretical Computer Science, vol. 478, pp. 76-100, Mar. 2013. Extended abstract in ICALP 2011, LNCS 6756, pp. 588-600, 2011.

Libert et Al: "Non-Interactive CCA2-Secure Threshold Cryptosystems with Adaptive Security: New Framework and Constructions"; In TCC 2012, LNCS 7194, pp. 75-93, Springer, 2012.

Lysyanskaya et Al: "Adaptive Security in the Threshold Setting From Cryptosystems to Signature Schemes"; In Asiacrypt'01, LNCS 2248, pp. 331-350, 2001.

Rabin: "A Simplified Approach to Threshold and Proactive RSA"; In Crypto'98, LNCS series, pp. 89-104, 1998.

Scott: "Authenticated ID-based Key Exchange and remote log-in with simple token and PIN number"; Cryptology ePrint Archive: Report 2002/164; pp. 1-9.

Shoup etal: "Securing Threshold Cryptosystems against Chosen Ciphertext Attack"; In J. of Cryptology, 15(2), pp. 75-96, 2002. Earlier version in eurocrypt'98, LNCS 1403, pp. 1-16, 1998.

Shoup: "Practical Threshold Signatures"; In Eurocrypt 2000, LNCS series, pp. 207-220, 2000.

Waters: "Efficient Identity-Based Encryption Without Random Oracles"; In Eurocrypt'05, LNCS series, 2005; pp. 1-13.

Wee: "Threshold and Revocation Cryptosystems via Extractable Hash Proofs"; In Eurocrypt'11, LNCS 6632, pp. 589-609, 2011.

Search Report dated Jun. 11, 2014.

* cited by examiner

SIGNING METHOD DELIVERING A PARTIAL SIGNATURE ASSOCIATED WITH A MESSAGE, THRESHOLD SIGNING METHOD, SIGNATURE VERIFICATION METHOD, AND CORRESPONDING COMPUTER PROGRAM AND ELECTRONIC DEVICES

This application claims the benefit, under 35 U.S.C. § 119 of European Patent Application No. 14305176.1, filed Feb. 10, 2014.

TECHNICAL FIELD

The disclosure relates to cryptography, and more particularly to threshold cryptography.

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Threshold cryptography relies on the fact that a cryptographic function (such as a decryption function or a signature function) is implemented in a distributed way on a plurality of devices that store private data, and can collaborate (e.g. when a number of devices which is beyond a defined threshold collaborate, the cryptographic function can be executed/computed). In the rest of the document, we focus on threshold signature schemes. Threshold signature schemes were first described in the article "*Threshold Cryptosystems*" by Y. Desmedt et al., published in the proceedings of the conference Crypto 89. In threshold signature schemes a secret key is split into several private shares that are distributed among n devices (such distribution is performed either via the use of a trusted device, or via an interactive protocol between the devices). Hence, such secret key is partially distributed on the devices involved in the scheme. To sign a message M any subset of strictly more than t devices can use their shares of the secret and execute an interactive signature generation protocol, which outputs a signature of M that can be verified by anybody using a unique fixed public key. The security notion for threshold signature schemes requires that no polynomial-time adversary that corrupts any t devices can learn any information about the secret key or can forge a valid signature on a new message of its choice with the help of a trusted dealer or without it by running an interactive protocol among all devices.

The security of threshold signature schemes has been extensively studied during the past years. Indeed, some security issues such as robustness (either in the random oracle model, or in the standard model), proactiveness, technique to support as high as possible a threshold t, efficiency in terms of computations, efficiency in terms of number of interactions between devices, the length of the shares, the use of a trusted device, adversary model (i.e. static or dynamic adversary), etc. have been raised, and some threshold signature schemes have been proposed in order to meet some of these requirements.

However, currently known adaptively secure threshold signatures require either interaction among servers during the signing process, long private key shares or reliable erasures (namely, servers should be able to perfectly erase intermediate computation results). Indeed, to the authors' knowledge, the most efficient adaptively secure non-interactive threshold signature is currently the construction obtained by applying the techniques disclosed in the article "*Shorter IBE and Signatures via Asymmetric Pairings*" by J. Chen et al., published in the proceedings of the conference Pairing 2012, to the system disclosed in the article entitled "*Adaptively Secure Non-Interactive Threshold Cryptosystems*" by B. Libert et al., published in the proceedings of the conference ICALP 2011. Concretely, at the 128-bit security level, each signature is comprised of 1024 bits (or 4 times 256 bits as each signature contains 4 group elements). However, the latter scheme requires safe erasures at each server.

The proposed technique aims to fill that gap.

SUMMARY

The present disclosure is directed to a signing method delivering a partial signature associated with a message, said partial signature being used in a threshold signing method, the signing method being executed on an electronic device. Such method is remarkable in that it comprises signing a hash of said message with a one-time linearly homomorphic structure preserving signature method with a partial secret key, said partial secret key being obtained from an output of a secret sharing scheme, and said signing delivering said partial signature associated with said message. In a preferred embodiment, such signing method is remarkable in that said message M is a sequence of binary elements and said hash H(M) belongs to a Cartesian product $\mathbb{G}^{K+1}$, where $\mathbb{G}$ is a group and $K \geq 1$.

In a preferred embodiment, such signing method is remarkable in that said one-time linearly homomorphic structure preserving signature method comprises determining K+1 elements in function of said hash H(M) and said partial secret key, each of said element belonging to $\mathbb{G}$, and said K+1 elements corresponding to said partial signature.

In a preferred embodiment, such signing method is remarkable in that said determining comprises the determination of said elements being equal to $\Pi_{k=1}^{K+1} H_k^{-u_i(j)[k]}$ from said partial private key $SK_j = \{u_1(j), \ldots, u_{K+1}(j)\}$.

In a preferred embodiment, such signing method is remarkable in that said secret sharing scheme is an (t,n) elements Shamir secret sharing scheme.

In a preferred embodiment, such signing method according is remarkable in that said secret sharing scheme is a dynamic secret sharing scheme.

In a preferred embodiment, such signing method is remarkable in that said dynamic secret sharing scheme is based on Pedersen's protocol.

In a preferred embodiment, it is proposed a threshold signing method delivering a threshold signature associated with a message, said signature being obtained from a combination of a set of t+1 partial signatures provided by t+1 devices among n devices. Such threshold signing method is remarkable in that each partial signature being obtained through the execution of a signing method as previously mentioned, and in that said combination is defined as a function of parameters defining a secret sharing scheme, said secret sharing scheme being a (t,n) threshold secret sharing scheme.

In a preferred embodiment, such threshold signing method is remarkable in that it comprises verifying said t+1 partial signatures from a vector of verification keys, said verifying being done before performing said combination, and comprising a verification of K pairing product equations.

In a preferred embodiment, such threshold signing method is remarkable in that said combination comprises multiplying elements of said t+1 partial signatures and using Lagrange interpolation in the exponent.

In a preferred embodiment, it is proposed a signature verification method of a threshold signature associated with a message, said threshold signature being obtained from an execution of a threshold signing method as mentioned previously. Such signature verification method is remarkable in that it comprises a verification of K pairing product equations involving public key's parameters and an obtained threshold signature.

According to an exemplary implementation, the different steps of the previous mentioned methods are implemented by a computer software program or programs, this software program comprising software instructions designed to be executed by a data processor of a relay module according to the disclosure and being designed to control the execution of the different steps of this method.

Consequently, an aspect of the disclosure also concerns a program liable to be executed by a computer or by a data processor, this program comprising instructions to command the execution of the steps of one of the methods as mentioned here above.

This program can use any programming language whatsoever and be in the form of a source code, object code or code that is intermediate between source code and object code, such as in a partially compiled form or in any other desirable form.

The disclosure also concerns an information medium readable by a data processor and comprising instructions of a program as mentioned here above.

The information medium can be any entity or device capable of storing the program. For example, the medium can comprise a storage means such as a ROM (which stands for "Read Only Memory"), for example a CD-ROM (which stands for "Compact Disc-Read Only Memory") or a microelectronic circuit ROM or again a magnetic recording means, for example a floppy disk or a hard disk drive.

Furthermore, the information medium may be a transmissible carrier such as an electrical or optical signal that can be conveyed through an electrical or optical cable, by radio or by other means. The program can be especially downloaded into an Internet-type network.

Alternately, the information medium can be an integrated circuit into which the program is incorporated, the circuit being adapted to executing or being used in the execution of the method in question.

According to one embodiment, an embodiment of the disclosure is implemented by means of software and/or hardware components. From this viewpoint, the term "module" can correspond in this document both to a software component and to a hardware component or to a set of hardware and software components.

A software component corresponds to one or more computer programs, one or more sub-programs of a program, or more generally to any element of a program or a software program capable of implementing a function or a set of functions according to what is described here below for the module concerned. One such software component is executed by a data processor of a physical entity (terminal, server, etc.) and is capable of accessing the hardware resources of this physical entity (memories, recording media, communications buses, input/output electronic boards, user interfaces, etc.).

Similarly, a hardware component corresponds to any element of a hardware unit capable of implementing a function or a set of functions according to what is described here below for the module concerned. It may be a programmable hardware component or a component with an integrated circuit for the execution of software, for example an integrated circuit, a smart card, a memory card, an electronic board for executing firmware etc. In a variant, the hardware component comprises a processor that is an integrated circuit such as a central processing unit, and/or a microprocessor, and/or an Application-specific integrated circuit (ASIC), and/or an Application-specific instruction-set processor (ASIP), and/or a graphics processing unit (GPU), and/or a physics processing unit (PPU), and/or a digital signal processor (DSP), and/or an image processor, and/or a coprocessor, and/or a floating-point unit, and/or a network processor, and/or an audio processor, and/or a multi-core processor. Moreover, the hardware component can also comprise a baseband processor and/or radio electronic circuits which receive or transmit radio signals.

Let's also remark that a step of obtaining an element/value in the present document can be viewed either as a step of reading such element/value in a memory unit of an electronic device or a step of receiving such element/value from another electronic device via communication means.

In one embodiment of the invention, it is proposed an electronic device being able to deliver a partial signature associated with a message, said partial signature being used in a threshold signing scheme. Such electronic device is remarkable in that it comprises means for signing a hash of said message with a one-time linearly homomorphic structure preserving signature means with a partial secret key, said partial secret key being obtained from an output of a secret sharing scheme, and said means for signing delivering said partial signature associated with said message.

In one embodiment, it is proposed an electronic device being able to deliver a threshold signature associated with a message, said signature being obtained from a combination of a set of t+1 partial signatures provided by t+1 devices among n devices. Such electronic device is remarkable in that it comprises means for obtaining of t+1 partial signatures obtained through the electronic device previously mentioned, and in that it comprises means for combining configured in function of parameters defining a secret sharing scheme, said secret sharing scheme being a (t,n) threshold secret sharing scheme.

At last, it is proposed an electronic device being able to verify a threshold signature associated with a message, said threshold signature being obtained from an electronic device as previously mentioned. Such electronic device is remarkable in that it comprises means for performing a verification of K pairing product equations involving public key's parameters and an obtained threshold signature.

BRIEF DESCRIPTION OF THE FIGURES

The above and other aspects of the disclosure will become more apparent by the following detailed description of exemplary embodiments thereof with reference to the attached drawings in which.

DETAILED DESCRIPTION

Figure 1A:
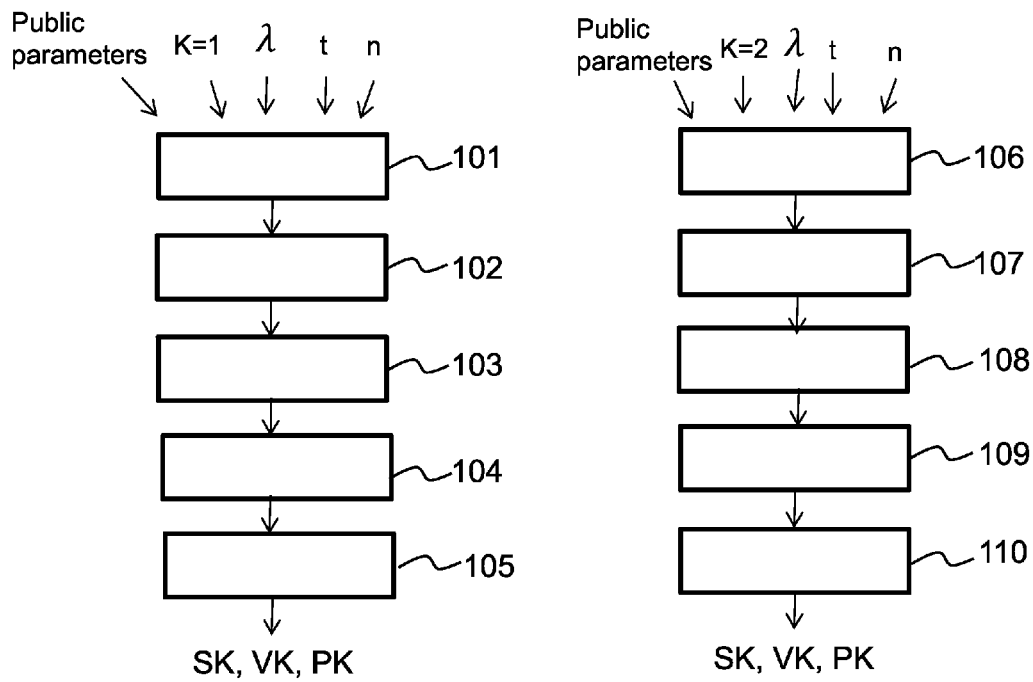
FIG. 1(a) presents a flowchart comprising some of the steps performed by an electronic device for generating, according to an embodiment of the invention, partial secret keys that are used in the signing method described in the FIG. 2, and other public parameters.
Figure 2:
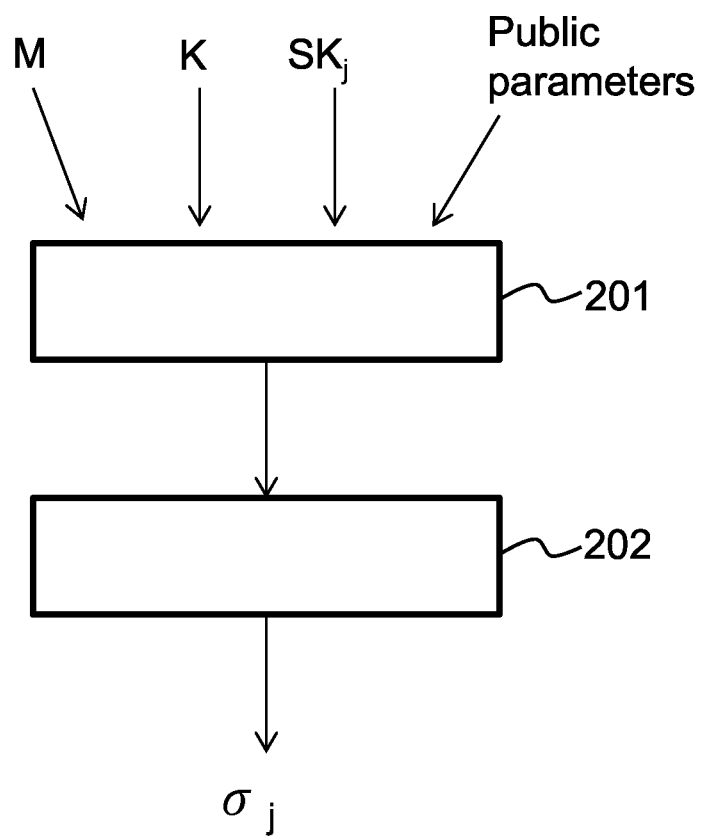
FIG. 2 presents a flowchart comprising some of the steps performed by an electronic device of a signing method delivering a partial signature associated with a message, according to one embodiment of the invention, said partial signature being used in a threshold signing method.

FIG. 1(a) presents a flowchart comprising some of the steps performed by an electronic device for generating, according to an embodiment of the invention, partial secret keys that are used in the signing method described in the FIG. 2, and other public parameters.

The following description is done for an integer parameter K that is a configuration parameter that determines the underlying problem on which the security relies, with values equal to one or two. However, one skilled in the art could generalize the following steps for other values of K strictly greater than two.

When K is equal to one, in such embodiment, an electronic device obtains a given a security parameter $\lambda$, a number of servers $n \in \mathbb{N}$, and a threshold $t \in \{1, \ldots, n\}$, which is the maximal number of servers that the adversary is allowed to corrupt. It also obtains (or chooses) a bilinear group $(\mathbb{G}, \hat{\mathbb{G}}, \mathbb{G}_T)$ of prime order $p > 2^\lambda$.

In a step referenced 101, the electronic device obtains (for example by randomly generating them) two elements of the group $\mathbb{G}$ (i.e. $\widehat{g_z}, \widehat{g_r}, \xleftarrow{R} \mathbb{G}$).

Then, in a step referenced 102, for each $j \in \{1,2\}$, the electronic device picks random exponents $a_j, b_j \xleftarrow{R} \mathbb{Z}_p^*$ and computes the group elements $\widehat{g_j} = \widehat{g_z}^{a_j} \cdot \widehat{g_r}^{b_j}$.

Then, in a step referenced 103, for each $j \in \{1,2\}$, the electronic obtains random polynomials $A_j[X], B_j[X] \in \mathbb{Z}_p[X]$ of degree t, such that $A_j(0)=a_j, B_j(0)=b_j$ respectively.

In a following step referenced 104, the electronic device define the i-th private key share as $SK_i = \{(A_j(i), B_j(i))\}_{j=1}^2$, for i=1 to n, and define the corresponding verification key as $VK_i = (\{\hat{V}_{j,i}\}_{j=1}^2)$ with $\hat{V}_{j,i} = \widehat{g_z}^{A_j(i)} \widehat{g_r}^{B_j(i)}$.

In a following step 105, the electronic device obtains (chooses) a hash function $H: \{0,1\}^* \to \mathbb{G}^2$ that ranges over $\mathbb{G} \times \mathbb{G}$. This hash function is modeled as a random oracle in the security analysis. The vector of private key shares is $SK = (SK_1, \ldots, SK_n)$ and the corresponding verification keys $VK = (VK_1, \ldots, VK_n)$. The public key consists of $PK = ((\mathbb{G}, \hat{\mathbb{G}}, \mathbb{G}_T), \widehat{g_z}, \widehat{g_r}, \{\widehat{g_j}\}_{j=1}^2, H)$.

In one embodiment, the electronic device can then distribute each of the partial key $SK_i$ to the corresponding electronic devices. In another embodiment, such distribution is performed in a secure channel. The public key and the verification keys are also distributed (and can be known from every devices). It should be noted that when K is equal to one, the scheme (being to the whole signature scheme) relies on the SXDH assumption in the random oracle.

When K is equal to two, in such embodiment, an electronic device obtains a given a security parameter $\lambda$, a number of servers $n \in \mathbb{N}$, and a threshold $t \in \{1, \ldots, n\}$. It also obtains (or chooses) a bilinear group $(\mathbb{G}, \hat{\mathbb{G}}, \mathbb{G}_T)$ of prime order $p > 2^\lambda$.

In a step referenced 106, the electronic device obtains (for example by randomly generating them) 4 elements of the group $\hat{\mathbb{G}}$ (i.e. $\widehat{g_z}, \widehat{g_r}, \widehat{h_z}, \widehat{h_u} \xleftarrow{R} \hat{\mathbb{G}}$)

Then, in a step referenced 107, for each $j \in \{1, 2, 3\}$, the electronic device picks random exponents $a_j, b_j, c_j \xleftarrow{R} \mathbb{Z}_p^*$ and computes group elements $\widehat{g_j} = \widehat{g_z}^{a_j} \cdot \widehat{g_r}^{b_j}$ and $\hat{h}_j = \widehat{h_z}^{a_j} \cdot \widehat{h_u}^{c_j}$.

Then, in a step referenced 108, for each $j \in \{1, 2, 3\}$, the electronic device chooses random polynomials $A_j[X], B_j[X], C_j[X] \in \mathbb{Z}_p[X]$ of degree t, such that $A_j(0)=a_j, B_j(0)=b_j$ and $C_j(0)=c_j$, respectively.

In a following step referenced 109, the electronic device defines the i-th private key share as $SK_i = \{(A_j(i), B_j(i), C_j(i))\}_{j=1}^3$, for i=1 to n, and defines the corresponding verification key as $VK_i = (\{\hat{V}_{j,i}, \hat{W}_{j,i}\}_{j=1}^3)$ with $\hat{V}_{j,i} = \widehat{g_z}^{A_j(i)} \widehat{g_r}^{B_j(i)}$ and $\hat{W}_{j,i} = \widehat{h_z}^{A_j(i)} \widehat{h_u}^{C_j(i)}$.

In a following step 110, the electronic device obtains (chooses) a hash function $H: \{0,1\}^* \to \mathbb{G}^3$ that ranges over $\mathbb{G} \times \mathbb{G} \times \mathbb{G}$. This hash function is modeled as a random oracle in the security analysis. The public key consists of $PK = ((\mathbb{G}, \hat{\mathbb{G}}, \mathbb{G}_T), \widehat{g_z}, \widehat{g_r}, \widehat{h_z}, \widehat{h_u}, \{\widehat{g_j}, \hat{h}_j\}_{j=1}^3, H)$.

Figure 1B:
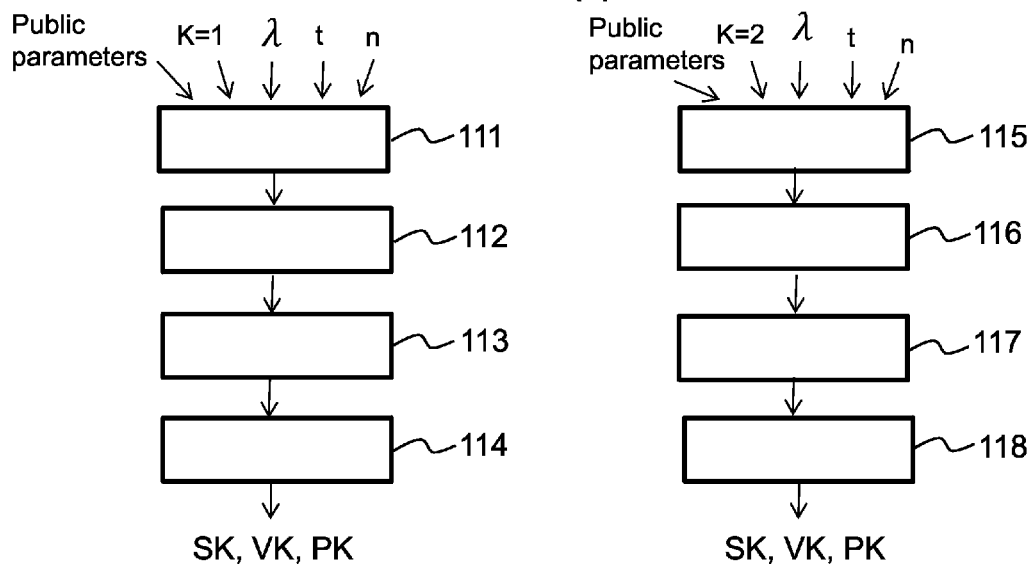
FIG. 1(b) presents a flowchart comprising some of the steps performed by an electronic device for generating and distributing, according to another embodiment of the invention, partial secret keys that are used in the signing method described in the FIG. 2, and other public parameters.

FIG. 1(b) presents a flowchart comprising some of the steps performed by an electronic device for generating and distributing, according to another embodiment of the invention, partial secret keys that are used in the signing method described in the FIG. 2, and other public parameters.

The following description is done for an integer parameter K that is a configuration parameter that determines the underlying problem on which the security relies, with values equal to one or two. However, one skilled in the art could generalize the following steps for other values of K strictly greater than two.

Compared to the description of technique disclosed in FIG. 1(a), which uses only one electronic device (then this technique can be qualified as a centralized technique), the technique disclosed in FIG. 1(b) is dynamic (and distributed) technique of generation partial secret keys. However, it should be noted that the technique of FIG. 1(a) can be considered equivalent to the technique of FIG. 1(b) with only one electronic device (also named a player).

When K is equal to one, in such embodiment, several electronic devices (or referenced as several player $P_i$) obtains a given a security parameter $\lambda$, a number of servers $n \in \mathbb{N}$, and a threshold $t \in \{1, \ldots, n\}$, with $n \geq 2t+1$. It also obtains (or chooses) a bilinear group $(\mathbb{G}, \hat{\mathbb{G}}, \mathbb{G}_T)$ of prime order $p > 2^\lambda$, a hash function $H: \{0,1\}^* \to \mathbb{G}^2$ (as K+1=2), and two generators chosen randomly in $\hat{\mathbb{G}}$, noted $\widehat{g_z}, \widehat{g_r}$ (in the generalized case, K(K+3) generators are needed).

In a step referenced 111, each of the electronic device $P_i$ shares (for example by randomly generating them) two (or K+1 in the generalized case) random pairs (or K+1 in the generalized case) of elements $\{(a_{ik0}, b_{ik0})\}_{k=1}^2$ as follows:

For each $k \in \{1,2\}$, an electronic device obtains two random polynomials $A_{ik}[X] = a_{ik0} + a_{ik1}X + \ldots a_{ikt}X^t$, and $B_{ik}[X] = b_{ik0} + b_{ik1}X + \ldots b_{ikt}X^t$ of degree t, and broadcast $\hat{W}_{ikl} = \widehat{g_z}^{a_{ikl}} \cdot \widehat{g_r}^{b_{ikl}}$ for all $l \in \{0, \ldots, t\}$;

For each $j \in \{1, \ldots, n\}$, the elements $\{A_{ik}(j), B_{ik}(j)\}_{k=1}^2$, are transmitted to the player $P_j$.

In a following step referenced 112, for each received shares $\{A_{jk}(i), B_{jk}(i)\}_{k=1}^2$, the player $P_i$ verifies if the following equations hold: $\widehat{g_z}^{A_j(i)} \cdot \widehat{g_r}^{B_j(i)} = \prod_{l=0}^t \hat{W}_{jlk}^{i^l}$, for $k \in \{1,2\}$. If these equalities do not both hold, the player $P_i$ broadcast a complaint against $P_j$.

In a following step referenced 113, any player who receives more than t complaints is immediately disqualified. Each player $P_i$ who receives a complaint from another player $P_j$ responds by returning the correct shares $\{A_{ik}(j), B_{ik}(j)\}_{k=1}^2$. If any of these new shares fail to satisfy the equations in step 112, the player $P_i$ is disqualified. Let $Q \subset \{1, \ldots, n\}$, be a set of non-disqualified players at the end of the step 113.

In a following step referenced 114, the public key PK is obtained as $PK = \{\widehat{g_k}\}_{k=1}^2$, where $\widehat{g_k} = \prod_{i \in Q} \hat{W}_{ik0} = \widehat{g_z}^{\Sigma_{i \in Q} a_{ik0}} \cdot \widehat{g_r}^{\Sigma_{i \in Q} b_{ik0}}$. Each player $P_i$ locally defines his private key share $SK_i = \{A_k(i), B_k(i)\}_{k=1}^2$, where $A_k(i) = \Sigma_{j \in Q} A_{jk}(i)$ and $B_k(i) = \Sigma_{j \in Q} B_{jk}(i)$. Any can publicly determines the corresponding verification key $VK_i = (\hat{V}_{1,i}, \hat{V}_{2,i})$ where $\hat{V}_{1,i} = \widehat{g_z}^{A_1(i)} \cdot \widehat{g_r}^{B_1(i)}$ and $\hat{V}_{2,i} = \widehat{g_z}^{A_2(i)} \cdot \widehat{g_r}^{B_2(i)}$. Hence, we have $VK_i = (\prod_{j \in Q} \prod_{l=0}^t \hat{W}_{j1l}^{i^l}, \prod_{j \in Q} \prod_{l=0}^t \hat{W}_{j2l}^{i^l})$. For any disqualified player $i \in \{1, \ldots, n\} \backslash Q$, the i-th private key share is implicitly set as $SK_i = \{0,0\}_{k=1}^2$, and the corresponding verification key is $VK_i = (\mathbb{G}, \mathbb{G})$. This complete the generation of the private key shares (or also named partial secret keys) $SK_1, \ldots, SK_n$, the verification keys $VK_1, \ldots, VK_n$, and the public key, which consists of the previously mentioned parameters $(\mathbb{G}, \hat{\mathbb{G}}, \mathbb{G}_T)$, $\widehat{g_z}$, $\widehat{g_r}$, the hash function H and the elements $\{\widehat{g_k}\}_{k=1}^2$.

When the technique proposed in FIG. 1(b) is executed, at the end, the private key shares $A_k(i)$ and $B_k(i)$ lie on a t-degree polynomials $A_k[X] = \Sigma_{j \in Q} A_{jk}[X]$ and $B_k[X] = \Sigma_{j \in Q} B_{jk}[X]$. Each player also holds an additive share $\{(a_{ik0}, b_{ik0})\}_{k=1}^2$ of the secret key $\{A_k(0), B_k(0)\}_{k=1}^2$, where $A_k(0) = \Sigma_{i \in Q} a_{ik0}$ and $B_k(0) = \Sigma_{i \in Q} b_{ik0}$, but these shares will not be used in the proposed technique.

When K is equal to two, in such embodiment, several electronic devices (or referenced as several player $P_i$) obtains a given a security parameter $\lambda$, a number of servers $n \in \mathbb{N}$, and a threshold $t \in \{1, \ldots, n\}$. It also obtains (or chooses) a bilinear group $(\mathbb{G}, \hat{\mathbb{G}}, \mathbb{G}_T)$ of prime order $p > 2^\lambda$, a hash function $H: \{0,1\}^* \to \mathbb{G}^3$ (as K+1=3), and four generators chosen randomly in $\hat{\mathbb{G}}$, noted $\widehat{g_z}, \widehat{g_r}, \widehat{h_z}, \widehat{h_u}$.

In a step referenced 115, each of the electronic device $P_i$ (among n devices) shares (for example by randomly generating them) three random triplets elements $\{(a_{ik0}, b_{ik0}, c_{ik0})\}_{k=1}^3$ as follows:

For each $k \in \{1, 2, 3\}$, an electronic device obtains three random polynomials (or K+1 in the generalized case), $A_{ik}[X] = a_{ik0} + a_{ik1}X + \ldots a_{ikt}X^t$, $B_{ik}[X] = b_{ik0} + b_{ik1}X + \ldots b_{ikt}X^t$ and $C_{ik}[X] = c_{ik0} + c_{ik1}X + \ldots c_{ikt}X^t$, each of degree t, and broadcast $\hat{V}_{ikl} = \widehat{g_z}^{a_{ikl}} \cdot \widehat{g_r}^{b_{ikl}}$ and $\hat{W}_{ikl} = \widehat{h_z}^{a_{ikl}} \cdot \widehat{h_u}^{c_{ikl}}$ for all $l \in \{0, \ldots, t\}$;

For each $j \in \{1, \ldots, n\}$, the elements $\{A_{ik}(j), B_{ik}(j), C_{ik}(j)\}_{k=1}^3$ are transmitted to the player $P_j$.

In a following step referenced 116, for each received shares $\{A_{jk}(i), B_{jk}(i), C_{jk}(i)\}_{k=1}^3$ the player $P_i$ verifies if the following equations hold: $\widehat{g_z}^{A_{jk}(i)} \cdot \widehat{g_r}^{B_{jk}(i)} = \prod_{l=0}^t \hat{V}_{jlk}^{i^l}$, and: $\widehat{h_z}^{A_{jk}(i)} \cdot \widehat{h_u}^{C_{jk}(i)} = \prod_{l=0}^t \hat{W}_{jkl}^{i^l}$ for $k \in \{1, 2, 3\}$. If these equalities do not both hold, the player $P_i$ broadcast a complaint against $P_j$.

In a following step referenced 117, any player who receives more than t complaints is immediately disqualified. Each player $P_i$ who receives a complaint from another player $P_j$ responds by returning the correct shares $\{A_{ik}(j), B_{ik}(j), C_{ik}(j)\}_{k=1}^3$. If any of these new shares fail to satisfy the equations in step 116, the player $P_i$ is disqualified. Let $Q \subset \{1, \ldots, n\}$, be a set of non-disqualified players at the end of the step 117.

In a following step referenced 118, the public key PK is obtained as $PK = \{\widehat{g_k}, \widehat{h_k}\}_{k=1}^3$, where $\widehat{g_k} = \prod_{i \in Q} \hat{V}_{ik0} = \widehat{g_z}^{\Sigma_{i \in Q} a_{ik0}} \cdot \widehat{g_r}^{\Sigma_{i \in Q} b_{ik0}}$ and $\widehat{h_k} = \prod_{i \in Q} \hat{W}_{ik0} = \widehat{h_z}^{\Sigma_{i \in Q} a_{ik0}} \cdot \widehat{h_u}^{\Sigma_{i \in Q} c_{ik0}}$. Each player $P_i$ locally defines his private key share $SK_i = \{A_k(i), B_k(i), C_k(i)\}_{k=1}^3$, where $A_k(i) = \Sigma_{j \in Q} A_{jk}(i)$, $B_k(i) = \Sigma_{j \in Q} B_{jk}(i)$ and $C_k(i) = \Sigma_{j \in Q} C_{jk}(i)$. Any can publicly determines the corresponding verification key $VK_i = (\{\hat{U}_{k,i}\}_{k=1}^3, \{\hat{Z}_{k,i}\}_{k=1}^3)$ where $\hat{U}_{k,i} = \widehat{g_z}^{A_k(i)} \cdot \widehat{g_r}^{B_k(i)}$ and $\hat{Z}_{k,i} = \widehat{h_z}^{A_k(i)} \cdot \widehat{h_u}^{C_k(i)}$ as, we have $(\hat{U}_{k,i}, \hat{Z}_{k,i}) = (\prod_{j \in Q} \prod_{l=0}^t \hat{V}_{jkl}^{i^l}, \prod_{j \in Q} \prod_{l=0}^t \hat{W}_{jkl}^{i^l})$, for $i \in Q$ and $k \in \{1, 2, 3\}$. For any disqualified player $i \in \{1, \ldots, n\} \backslash Q$, the i-th private key share is implicitly set as $SK_i = \{0, 0, 0\}_{k=1}^3$, and the corresponding verification key is $VK_i = (\{\mathbb{G}, \mathbb{G}\}_{k=1}^3)$. This complete the generation of the private key shares (or also named partial secret keys) $SK_1, \ldots, SK_n$, the verification keys $VK_1, \ldots, VK_n$, and the public key, which comprises the previously mentioned parameters $(\mathbb{G}, \hat{\mathbb{G}}, \mathbb{G}_T)$, $\widehat{g_z}$, $\widehat{g_r}$, $\widehat{h_z}$, $\widehat{h_u}$ the hash function H and the elements $\{\widehat{g_k}, \widehat{h_k}\}_{k=1}^3$.

When the technique proposed in FIG. 1(b) is executed, at the end, the private key shares $A_k(i)$ and $B_k(i)$ lie on a t-degree polynomials $A_k[X] = \Sigma_{j \in Q} A_{jk}[X]$ and $B_k[X] = \Sigma_{j \in Q} B_{jk}[X]$. Each player also holds an additive share $\{(a_{ik0}, b_{ik0})\}_{k=1}^2$ of the secret key $\{A_k(0), B_k(0)\}_{k=1}^2$, where $A_k(0) = \Sigma_{i \in Q} a_{ik0}$ and $B_k(0) = \Sigma_{i \in Q} b_{ik0}$, but these shares will not be used in the proposed technique.

FIG. 2 presents a flowchart comprising some of the steps performed by an electronic device of a signing method delivering a partial signature associated with a message, according to one embodiment of the invention, said partial signature being used in a threshold signing method.

The signing method that delivers a partial signature associated with a message takes as input a message $M \in \{0; 1\}^*$ (i.e. that is a sequence of binary elements 0 and 1; this sequence usually is finite as it corresponds to a finite data (such as a binary file, etc.) and therefore has a finite length). It also takes as input the integer parameter K that is a configuration parameter that determines the underlying problem on which the security relies, and (indirectly) the number of elements comprised in the partial signature, as well as in a partial secret key (which is also an input parameter for the signing method, such partial secret key being stored on a memory unit of the electronic device, or obtained (i.e. received) from another secure device). The cases with K=1, or K=2 are the most used. The method takes also as input some public parameters (known from the other devices) such as finite group $\mathbb{G}$, another finite group $\hat{\mathbb{G}}$ and a target finite group $\mathbb{G}_T$, these groups being qualified of an asymmetric bilinear group (in the sense that a bilinear map e exists from the Cartesian group $\mathbb{G} \times \hat{\mathbb{G}}$ to the target finite group $\mathbb{G}_T$) of prime order $p > 2^\lambda$, where $\lambda$ is a security parameter. The public parameters also comprise information for indicating the hash function to be used. Such hash function takes as input a sequence of binary elements 0 and 1 and outputs n group elements belonging to $\mathbb{G}$ (e.g. we have $H(M)=(H_1, \ldots, H_{K+1})$ with $H_i \in \mathbb{G}$ for all $i \in \{1, \ldots, K+1\}$. In such embodiment, the partial secret key, which is obtained (generated) by a process detailed in FIG. 1(a) or 1(b), for an electronic device referenced as electronic device j is defined as being $SK_j=\{u_1(j), \ldots, u_{K+1}(j)\}$, where the elements $u_i(j)$ for all $i \in \{1, \ldots, K+1\}$ can be viewed as a vector of K+1 groups elements of $\mathbb{Z}_p$ (e.g. $u_i(j) \in \mathbb{Z}_p^{K+1}$, and we have $u_i(j)[k] \in \mathbb{Z}_p$ for all $k \in \{1, \ldots, K+1\}$). Hence, the partial secret key $SK_j$ comprises $(K+1)^2$ groups elements of $\mathbb{Z}_p$.

In a step, referenced 201, the electronic device determines (via a computation performed partially or completely via the electronic device itself, or via an interaction with another device that is able to perform such computation) the elements $H(M)=(H_1, \ldots, H_{K+1})$ Examples of hash functions ranging over pairing-friendly cyclic groups are given in "*Short Signatures from the Well Pairing*", by D. Boneh, B. Lynn, H. Shacham, published Asiacrypt 2001.

Then, in a step referenced 202, the electronic device j determines K+1 group elements of $\mathbb{G}$, noted $s_1^{(j)}, \ldots, s_{K+1}^{(j)}$. These elements $s_1^{(j)}, \ldots, s_{K+1}^{(j)}$ correspond to the partial signature generated by the electronic device j. These elements are defined by the following equation:

$$s_i^{(j)} = \Pi_{k=1}^{K+1} H_k^{-u_i(j)[k]} \text{ for all } i \in \{1, \ldots, K+1\}$$

The partial signature generated by the electronic device j can be noted as $\sigma_j=(s_1^{(j)}, \ldots, s_{K+1}^{(j)})$.

When K is equal to one, as explained in FIG. 1(a) or in FIG. 1(b), we have $SK_j=\{u_1(j),u_2(j)\}$ with $u_1(j)=(A_1(j),A_2(j))$, and $u_2(j)=(B_1(j),B_2(j))$.

When K is equal to two, as explained in FIG. 1(a) or in FIG. 1(b), we have $SK_j=\{u_1(j),u_2(j),u_3(j)\}$ with $u_1(j)=(A_1(j),A_2(j),A_3(j))$, $u_2(j)=(B_1(j),B_2(j),B_3(j))$ and $u_3(j)=(C_1(j),C_2(j),C_3(j))$.

Figure 3:
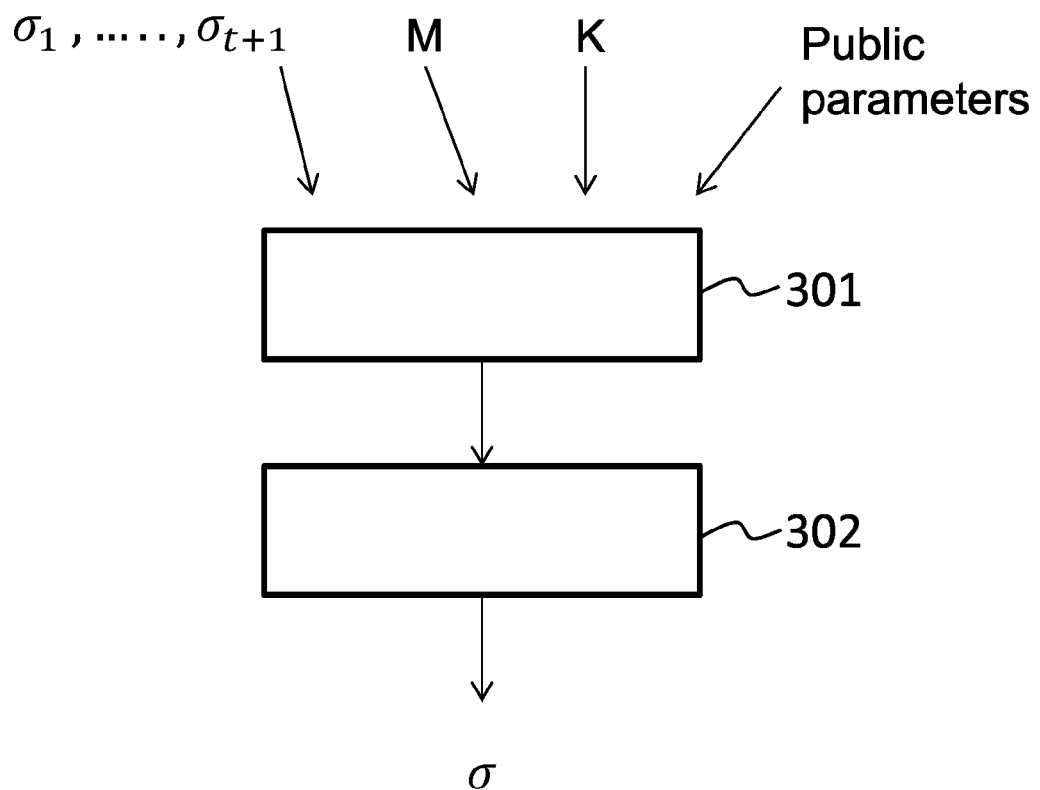
FIG. 3 presents a flowchart comprising some of the steps performed by an electronic device that determine a threshold signature associated with a message from a set of partial signature obtained from a process depicted in the FIG. 2.

FIG. 3 presents a flowchart comprising some of the steps performed by an electronic device that determine a threshold signature associated with a message from a set of partial signature obtained from a process depicted in the FIG. 2.

More precisely, an electronic device which obtains a set of partial signature comprising at least t+1 partial signature (for example the partial signatures $\sigma_1, \ldots, \sigma_{t+1}$) as well as some public parameters (comprising the number K previously mentioned) and a message M. The public parameters can comprise the public elements generated via the method described in FIG. 1(a) or 1(b). The electronic device determines the hash of the message M via the use of a hash function as explained in the description of the FIG. 1.

In one embodiment, the method for determining a threshold signature comprises a step of verifying the partial signature $\sigma_1, \ldots, \sigma_{t+1}$, referenced 301, via the use of a vector of verification keys that was generated according to the technique described in FIG. 1(a) or 1(b).

Such step 201 comprises, for each of the partial signature $\sigma_k$, a verification of K pairing equations.

For example, when K is equal to one, only one pairing equation has to be verified. This pairing equation is the following one:

$$e(s_1^{(k)}, \hat{g}_z)e(s_2^{(k)}, \hat{g}_r) \cdot \Pi_{j=1}^2 e(H_j, \hat{V}_{j,k}) = \mathbb{G}$$

For example, when K is equal to two, then two pairing equations have to be verified. These pairing equations are the following ones:

$$e(s_1^{(k)}, \hat{g}_z)e(s_2^{(k)}, \hat{g}_r) \cdot \Pi_{j=1}^3 e(H_j, \hat{V}_{j,k}) = \mathbb{G}$$

$$e(s_1^{(k)}, \hat{h}_z)e(s_3^{(k)}, \hat{h}_u) \cdot \Pi_{j=1}^3 e(H_j, \hat{V}_{j,k}) = \mathbb{G}$$

If at least one of the pairing equations is not verified, then an error is reported, meaning that at least one of the partial signature is corrupted. Then, the process is interrupted. However, if all the pairing equations have been verified in step 301, a step of combining the partial signature $\sigma_1, \ldots, \sigma_{t+1}$, referenced 302, is performed.

In such step 302, the threshold signature $\sigma=(s_1, \ldots, s_{K+1})$ (under the K-linear hypothesis) is determined by the electronic device by obtaining $$s_k = \Pi_{i=1}^{t+1} s_k^{(i) \lambda_i(0)},$$

via a Lagrange interpolation in the exponent, for all $k \in \{1, \ldots, K+1\}$ (see the section "*Lagrange interpolation formula*" of the document "*Encyclopedia of Mathematics*", by Hazewinkel, Michiel, ed. (2001, Springer, ISBN 978-1-55608-010-4).

Figure 4:
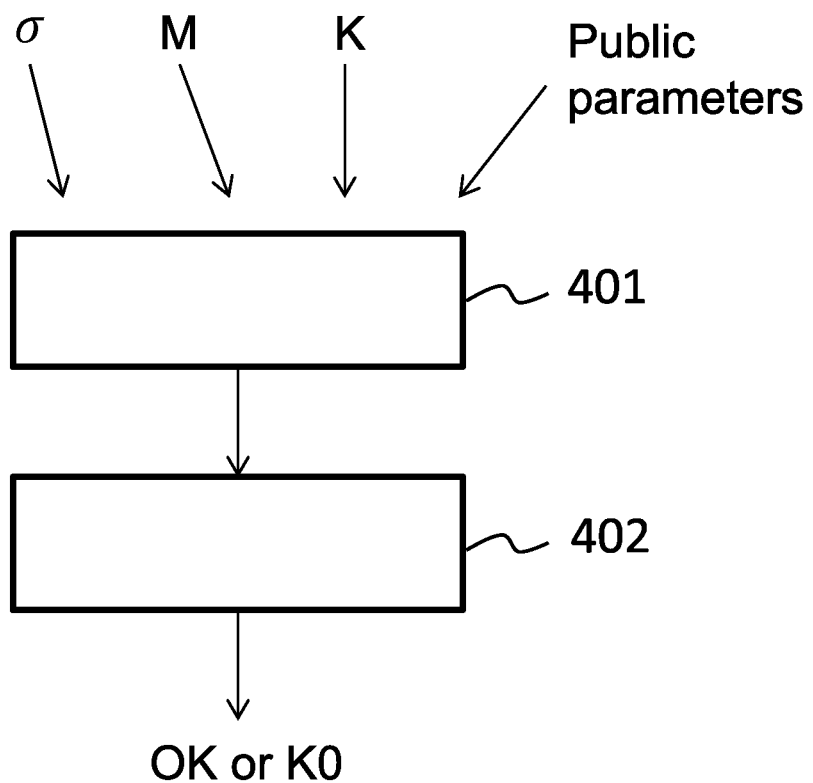
FIG. 4 presents a flowchart comprising some of the steps performed by an electronic device that verify a threshold signature associated with a message.

FIG. 4 presents a flowchart comprising some of the steps performed by an electronic device that verify a threshold signature associated with a message.

Such verification process of a threshold signature associated with a message takes as input a message M, a threshold signature $\sigma$ associated with said message, some public parameters such as an information to recover or to execute the hash function H already mentioned. In one embodiment of the invention, the electronic device determines the values of $H(M)=(H_1, \ldots, H_{K+1}) \in \mathbb{G}^{K+1}$ in a step referenced 401.

Then, in a step referenced 402, the electronic device checks if K pairing equations are verified.

For example, when K is equal to one, only one pairing equation has to be verified. This pairing equation is the following one:

$$e(s_1, \hat{g}_z)e(s_2, \hat{g}_r) \cdot \Pi_{j=1}^2 e(H_j, \hat{g}_j) = \mathbb{G}$$

For example, when K is equal to two, then two pairing equations have to be verified. These pairing equations are the following ones:

$$e(s_1, \hat{g}_z)e(s_2, \hat{g}_r) \cdot \Pi_{j=1}^3 e(H_j, \hat{g}_j) = \mathbb{G}$$

$$e(s_1, \hat{h}_z)e(s_2, \hat{h}_u) \cdot \Pi_{j=1}^3 e(H_j, \hat{g}_j) = \mathbb{G}$$

If the electronic device detects that one of these pairing equation is not verified, then it means that the received threshold signature is corrupted (or erroneous).

It should be noted that, in one embodiment, the combination (and therefore the generation and the verification of the threshold signature) can be made in the same electronic device, from several partial signature $\sigma_1, \ldots, \sigma_{t+1}$.

When K is equal to one, If the threshold signature/verification method is instantiated using Barreto-Naehrig curves (see the article: "*Pairing-Friendly Elliptic Curves of Prime Order*" by P. Barreto et al., published in the proceedings of the conference SAC'05) at the 128-bit security level, each signature consists of 512 bits, or 17% of the size of Shoup's RSA-based threshold signatures as described in the article: "*Practical Threshold Signatures*" by V. Shoup, in the proceedings of the conference Eurocrypt 2000 (which are not known to provide adaptive security) for the same security level. The scheme is also very efficient from a computational standpoint: each electronic device that performs the combining operations only has to compute a multi-exponentiation with two base elements and two "hash-on-curve" operations. The electronic device that verifies a threshold signature merely has to compute a product of four pairings. From a security point of view, it can be proven that the proposed threshold signature/verification method provides adaptive security in the random oracle model under the SXDH assumption. Using Coron's technique (detailed in the article: "*On the Exact Security of Full Domain Hash*" by J.-S. Coron, published in the proceedings of CRYPTO 00), the following theorem can be proven: The proposed scheme provides adaptive security in the random oracle model if the SXDH assumption holds in both $\mathbb{G}$ and $\hat{\mathbb{G}}$. Namely, for any probabilistic polynomial-time adversary A, there exist DDH distinguisher $\mathcal{B}'_1$ and $\mathcal{B}'_2$ with comparable running time in the groups $\mathbb{G}$ and $\hat{\mathbb{G}}$ and such that $$\mathrm{Adv}(A) \le e(q_s+1) \cdot (\mathrm{Adv}^{DDH_1}(\mathcal{B}'_1) + \mathrm{Adv}^{DDH_2}(\mathcal{B}'_2) + 1/p).$$

where $q_s$ is the number of signing queries and e is the base for the natural logarithm.

We remark, that even if the SXDH assumption turns out to be false in the groups someday, the scheme can still be proved secure against static corruptions using a variant of the computational Diffie-Hellman assumption (called co-CDH assumption in the article "*Threshold Signatures, Multisignatures and Blind Signatures Based on the Gap-Diffie-Hellman-Group Signature Scheme*" by A. Boldyreva, and published in the proceedings of the conference PKC 03): in this case, the proof of static security for Boldyreva's threshold signature readily extends to prove the above construction secure against static adversaries. The scheme thus provides two levels of security guarantees in the random oracle model: it provides adaptive security under the SXDH assumption and static security under the weaker co-CDH assumption.

When K is equal to two, the scheme provides adaptive security in the random oracle model if the DLIN assumption holds in both $\mathbb{G}$ and $\hat{\mathbb{G}}$. Namely, for any probabilistic polynomial-time adversary A, there exist DLIN distinguisher $\mathcal{B}_1$ and $\mathcal{B}_2$ in the groups $\mathbb{G}$ and $\hat{\mathbb{G}}$ and such that $$\mathrm{Adv}(A) \le e(q_s+1) \cdot (\mathrm{Adv}^{DLN_1}(\mathcal{B}_1) + \mathrm{Adv}^{DLN_2}(B_2) + 1/p)$$

where $q_s$ is the number of signing queries and e is the base for the natural logarithm.

When K is strictly greater than two, the proposed scheme provides adaptive security in the random oracle model if the K-linear assumption holds.

It should be noted that the proposed embodiments, where K is equal to one or two, can be seen as variants of Boldyreva's short threshold signatures. However, while Boldyreva's construction is not known to provide adaptive security in its non-interactive version, our two schemes are fully non-interactive and can be proved secure against adaptive corruptions. Our idea is to build on the linearly homomorphic one-time structure-preserving signatures. The reason why they help us achieve adaptive security in the threshold setting is that, in the security proofs of the technique disclosed in the article: "*Linearly Homomorphic Structure-Preserving Signatures and their Applications*" by B. Libert, et al., and published in the proceeding of the conference Crypto 2013, the reduction knows the private key of the signature scheme. If this private key is shared in a t-out-of-n fashion, the reduction can consistently respond adaptive corruption queries since it has all the private key shares at disposal. To turn a homomorphic one-time structure-preserving signatures into full-fledged threshold signatures, we proceed as follows. First, the private key is obviously shared among n servers using Shamir's secret sharing. Second, we use a random oracle to derive the group elements to be signed from the messages which have to be signed during the distributed signing process. In the case where K is equal to one, we implicitly use the second linearly homomorphic signature, where we handle vectors of dimension 2. The public key consists of elements $\hat{g}_z$, $\hat{g}_r \in \hat{\mathbb{G}}$ and $\hat{g}_1 = \hat{g}_z^{a_1} \cdot \hat{g}_r^{b_1}$ and $\hat{g}_2 = \hat{g}_z^{a_2} \cdot \hat{g}_r^{b_2}$ whereas the underlying private key $a_1$, $a_2$, $b_1$, $b_2 \xleftarrow{R} \mathbb{Z}_p^*$ is shared among n servers. In order to distributively sign a message M, each electronic devices hashes the message M to obtain a pair of group elements $(H_1,H_2)=H(M) \in \mathbb{G} \times \mathbb{G}$. The resulting vector $(H_1,H_2)$ is then signed by having each electronic device compute a linearly homomorphic structure-preserving signature using its local shares of the private key $a_1$, $a_2$, $b_1$, $b_2 \in \mathbb{Z}_p^*$.

Although the underlying linearly homomorphic signature only provides one-time security, we can prove that the resulting threshold signature is a secure full-fledged signature scheme in the random oracle model. In the threshold setting, we can even prove it secure against adaptive corruptions. The idea of the proof is as follows. The reduction "programs" the random oracle in such a way that, for any message M for which partial signatures are requested by the adversary, the resulting hash value $(H_1,H_2)$ always lives in a one-dimensional subspace: by doing so, we can make sure that the adversary only obtains redundant information about the shared private key $a_1$, $a_2$, $b_1$, $b_2 \in \mathbb{Z}_p^*$. At the end of the day, this private key will still be information-theoretically undetermined after a polynomial number of signing queries. At the same time, for the specific message M* involved in the adversary's forgery, the hash value $(H_1^*,H_2^*)=H(M^*)$ will land outside the one dimensional subspace if the reduction is lucky. This implies that, with overwhelming probability, the adversary's fake signature on M* will be different from the one computed by the reduction on the same message. The reduction will thus have two distinct signatures on the same vector $(H_1^*,H_2^*)$ at disposal, which will allow it to solve the underlying hard problem. The reason why the scheme can be proved secure against adaptive corruptions is that, throughout the game, the entire private key (more precisely, the whole set of private key shares) is available to the reduction at all times, which makes it possible to answer adaptive corruption queries at will.

It should be noticed that the technique of FIG. 1(b) which is a distributed key generation phase, uses Pedersen's protocol (or more precisely a variant with two generators). Each player verifiably shares a random secret using Pedersen's verifiable secret sharing (where verification is enabled by having all parties broadcast commitments to their secret polynomials), and the final secret key is obtained by summing up the shares of non-disqualified players. When all parties honestly use the proposed technique, a single communication round is needed. Moreover, such technique does not need to rely on zero-knowledge proofs or reliable erasures at any time. However, it should be noted that Pedersen's protocol does not guarantee the uniform distribution of generated public keys: as shown in the article "*Secure Distributed Key Generation for Discrete-Log Based Cryptosystems*" by R. Gennaro et al., published in the proceedings of the conference Eurocrypt'99, even a static adversary can bias the distribution of the public key by corrupting only two players. Fortunately, Pedersen's protocol can still be safely used in certain application like threshold Schnorr signatures. However, it seems that these secure applications of Pedersen's protocol were in the static corruption setting. Here, in a scenario of adaptive attackers, the proposed technique takes advantage of two specific properties in the underlying homomorphic signature. First, it is key homomorphic. Second, in the security proof of the article "*Linearly Homomorphic Structure-Preserving Signatures and their Applications*" by B. Libert et al., published in the proceedings of the conference Crypto 2013, the reduction always knows the private key, which makes it possible to answer adaptive corruption queries at will.

Figure 5:
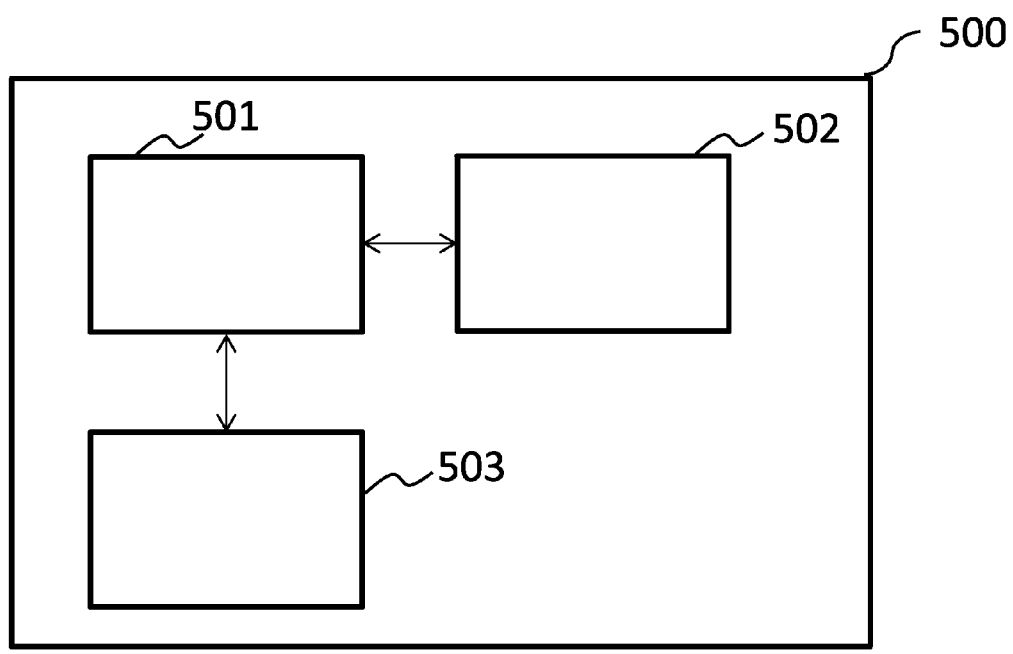
FIG. 5 presents an electronic device that can be used to perform one or several steps of the flowcharts of the FIGS. 1 to 4.

FIG. 5 presents an electronic device that can be used to perform one or several steps of the flowcharts of the FIGS. 1 to 4(*b*).

Such device referenced 500 comprises a computing unit (for example a CPU, for "Central Processing Unit"), referenced 501, and one or more memory units (for example a RAM (for "Random Access Memory") block in which intermediate results can be stored temporarily during the execution of instructions a computer program, or a ROM ("Read Only Memory") block in which, among other things, computer programs are stored, or an EEPROM ("Electrically-Erasable Programmable Read-Only Memory") block, or a flash block) referenced 502. Computer programs are made of instructions that can be executed by the computing unit. Such device 500 can also comprise a dedicated unit, referenced 503, constituting an input-output interface to allow the device 500 to communicate with other devices. In particular, this dedicated unit 503 can be connected with an antenna (in order to perform communication without contacts), or with serial ports (to carry communications "contact"). It should be noted that the arrows in FIG. 5 signify that the linked unit can exchange data through buses for example together. In a variant, the device 500 comprises one or more hardware modules as described previously.

In an alternative embodiment, some or all of the steps of the methods (signing, threshold signing or verifying) previously described, can be implemented in hardware in a programmable FPGA ("Field Programmable Gate Array") component or ASIC ("Application-Specific Integrated Circuit") component.

In an alternative embodiment, some or all of the steps of the methods previously described, can be executed on an electronic device comprising memory units and processing units as the one disclosed in the FIG. 5.

The invention claimed is:

1. A signing method for delivering a digital partial signature associated with a message M, said digital partial signature being used in a threshold signing method that provides adaptive security in the random oracle model without using reliable erasures at any time, the signing method being executed on an electronic device, wherein the signing method comprises:

signing a hash of said message M with a one-time linearly homomorphic structure preserving signature method with a partial secret key, said partial secret key being obtained from an output of a secret sharing scheme;

delivering said digital partial signature associated with said message M, wherein said message M is a sequence of binary elements and said hash H(M) belongs to a Cartesian product $\mathbb{G}^{K+1}$, where $\mathbb{G}$ is a group and $K \geq 1$; and wherein said one-time linearly homomorphic structure preserving signature method comprises determining K+1 elements as a function of said hash H(M) and said partial secret key, each of said K+1 elements belonging to $\mathbb{G}$, and said K+1 elements corresponding to said digital partial signature, and wherein said determining comprises the determination of said K+1 elements being equal to $\Pi_{k=1}^{K+1} H_k^{-u_i(j)[k]}$ from said partial private key that is equal to $SK_j = \{u_1(j), \ldots, u_{K+1}(j)\}$, with $u_i(j) \in \mathbb{Z}_p^{K+1}$, for $i \in \{1, \ldots, K+1\}$ and where $H(M) = (H_1, \ldots, H_{K+1}) \in \mathbb{G}^{K+1}$.

2. The signing method according to claim 1, wherein said secret sharing scheme is a (t,n) elements Shamir secret sharing scheme.

3. The signing method according to claim 1, wherein said secret sharing scheme is a dynamic secret sharing scheme.

4. The signing method according to claim 3, wherein said dynamic secret sharing scheme is based on Pedersen's protocol.

5. A threshold signing method for delivering a digital threshold signature associated with a message M, said threshold signing method comprising:

generating said digital threshold signature from a combination of a set of t+1 digital partial signatures provided by t+1 devices among n devices, wherein each digital partial signature being obtained through an execution of the signing method according to any of claims 1, and 2 to 4, and wherein said combination is defined as a function of parameters defining a (t,n) threshold secret sharing scheme; and delivering said digital threshold signature associated with said message M;

and wherein said threshold signing method provides adaptive security in the random oracle model without using reliable erasures at any time.

6. The threshold signing method according to claim 5, comprising:

verifying said t+1 digital partial signatures from a vector of verification keys, said verifying being done before performing said combination and comprising performing a verification of K pairing product equations.

7. The threshold signing method according to claim 5, wherein said combination comprises multiplying elements of said t+1 digital partial signatures and using Lagrange interpolation in the exponent.

8. A digital signature verification method for verifying a digital threshold signature associated with a message M, said digital signature verification method comprising:

obtaining said digital threshold signature through an execution of the threshold signing method of claim 5; and performing a verification of K pairing product equations involving a public key's parameters and said obtained digital threshold signature, and wherein said digital signature verification method provides adaptive security in the random oracle model without using reliable erasures at any time.

9. A non-transitory computer-readable storage medium storing a computer program comprising a set of computer-executable instructions to implement a method for cryptographic computations when the instructions are executed by a computer, wherein the instructions, when executed, configure the computer to perform a signing method for delivering a digital partial signature associated with a message M, said digital partial signature being used in a threshold signing method that provides adaptive security in the random oracle model without using reliable erasures at any time, wherein the signing method comprises:

signing a hash of said message M with a one-time linearly homomorphic structure preserving signature method with a partial secret key, said partial secret key being obtained from an output of a secret sharing scheme;

delivering said digital partial signature associated with said message M, wherein said message M is a sequence of binary elements and said hash H(M) belongs to a Cartesian product $\mathbb{G}^{K+1}$, where $\mathbb{G}$ is a group and $K \geq 1$; and wherein said one-time linearly homomorphic structure preserving signature method comprises determining K+1 elements as a function of said hash H(M) and said partial secret key, each of said K+1 elements belonging to $\mathbb{G}$, and said K+1 elements corresponding to said digital partial signature, and wherein said determining comprises the determination of said K+1 elements being equal to $\Pi_{k=1}^{K+1} H_k^{-u_i(j)[k]}$ from said partial private key that is equal to $SK_j = \{u_1(j), \ldots, u_{K+1}(j)\}$, with $u_i(j) \in \mathbb{Z}_p^{K+1}$, for $i \in \{1, \ldots, K+1\}$ and where $H(M) = (H_1, \ldots, H_{K+1}) \in \mathbb{G}^{K+1}$.

10. An electronic device for delivering a digital partial signature associated with a message M, said digital partial signature being used in a threshold signing method that provides adaptive security in the random oracle model without using reliable erasures at any time, wherein said electronic device comprises a hardware component configured to:

sign a hash of said message M with a one-time linearly homomorphic structure preserving signature hardware unit with a partial secret key, said partial secret key being obtained from an output of a secret sharing scheme;

deliver said digital partial signature associated with said message M, wherein said message M is a sequence of binary elements and said hash H(M) belongs to a Cartesian product $\mathbb{G}^{K+1}$, where $\mathbb{G}$ is a group and $K \geq 1$, and wherein said one-time linearly homomorphic structure preserving signature hardware unit is configured to determine K+1 elements as a function of said hash H(M) and said partial secret key, each of said K+1 elements belonging to $\mathbb{G}$, and said K+1 elements corresponding to said digital partial signature, and wherein said one-time linearly homomorphic structure preserving signature hardware unit is further configured to perform the determination of said K+1 elements from determination of $\Pi_{k=1}^{K+1} H_k^{-u_i(j)[k]}$ from said partial private key that is equal to $SK_j = \{u_1(j), \ldots, u_{K+1}(j)\}$, with $u_i(j) \in \mathbb{Z}_p^{K+1}$, for $i \in \{1, \ldots, K+1\}$ and where $H(M) = (H_1, \ldots, H_{K+1}) \in \mathbb{G}^{K+1}$.

11. An electronic device for delivering a digital threshold signature associated with a message M, wherein said electronic device comprises a hardware component configured to:

generate said digital threshold signature from a combination of a set of t+1 digital partial signatures provided by t+1 devices among n devices, wherein each digital partial signature is obtained from an electronic device according to claim 10, and wherein said combination is defined as a function of parameters defining a (t,n) threshold secret sharing scheme; and deliver said digital threshold signature associated with said message M, and wherein said digital threshold signature provides adaptive security in the random oracle model without using reliable erasures at any time.

12. An electronic device for verifying a digital threshold signature associated with a message M, wherein said electronic device comprises a hardware component configured to:

obtain said digital threshold signature from an electronic device according to claim 11; and perform a verification of K pairing product equations involving a public key's parameters and said obtained digital threshold signature, and wherein digital threshold signature verification provides adaptive security in the random oracle model without using reliable erasures at any time.

* * * * *